March 25, 1969     S. I. PERSSON     3,435,405

ULTRASONIC VEHICLE PRESENCE DETECTOR

Filed May 22, 1967

INVENTOR.
S. I. PERSSON

BY Forest B. Hitchcock

HIS ATTORNEY

United States Patent Office 3,435,405
Patented Mar. 25, 1969

3,435,405
ULTRASONIC VEHICLE PRESENCE DETECTOR
Sten I. Persson, Naples, N.Y., assignor to General Signal Corporation, Rochester, N.Y., a corporation of New York
Filed May 22, 1967, Ser. No. 640,022
Int. Cl. G01s 9/66
U.S. Cl. 340—1                    5 Claims

ABSTRACT OF THE DISCLOSURE

Apparatus for indicating the presence of objects, where ultrasonic energy is emitted by an electroacoustical transducer in a direction intercepting the predetermined path of moving objects and energy reflected from the surface of the objects produces responding signals in the transducer. The electrical signals generated in response to the reflected energy are conducted to a receiver sharply tuned to the sum frequency of the transmitted ultrasonic pulse and a secondary oscillator signal. The received electrical signals, of essentially single ultrasonic frequency content, are mixed in the receiver with the signal of the secondary oscillator thus producing a frequency summation signal. The receiver is rendered responsive for gated periods encompassing only the anticipated time for receipt of electrical signals relative to the energy reflected from the object surface and is rendered unresponsive by a blanking signal generated in response to electrical noise transients. The receiver, when not rendered unresponsive by the blanking signal produces a manifestation of object presence in response to reflected signals received during the gated periods.

Background of the invention

The present invention relates to vehicle sonic detector systems and more particularly to a sonic detector using a sum frequency receiver and noise blanking.

In the field of object detection sonic systems have found wide spread application. This is chiefly due to the easily achievable response times required for the detection and discrimination of sonic signals reflected from object surfaces. Since such response times are in the range of milliseconds sonic detector systems are practically and economically feasible for application in vehicle detection and traffic control.

Although particularly suitable to vehicle applications, sonic systems are subject to a variety of problems mainly concerned with the manfesting of false indications of vehicle presence. Obviously any system involved with the control of traffic which is prone to the giving of false indications is capable of causing annoying if not serious traffic tieups, delays, etc. Analysis of systems in operation has indicated that the false actuation of the detector, is due, in the vast majority of cases, to the receipt of apparent vehicle signals substantially induced by electrical noise signals present in the environment of the detector or generated within the circuitry of the detector itself. Detailed attention to this problem has resulted in the implementation of various schemes for the elimination of this serious shortcoming in present vehicle detector systems.

Prior art has established the used of preconditioned signal recognition as a particularly adaptable and successful means for eliminating false indications. In these schemes the receiver is established so as to only recognize transducer signals possessing characteristic particularly correlative to the transmitted sonic energy pulses and further such pulses must be received on a regular basis having a specified period before any manfestation of vehicle presence is indicated.

Another innovation recently introduced to accomplish the elimination of noise is that of noise blanking. This entails the sensing of electrical noise signals and the generation of a blanking signal, which signal suppresses the receiver response for a period contemporaneous with the electrical noise signals. Since the receiver rejects all signals when suppressed by the blanking signal it cannot respond to noise.

These prior art schemes still, however, do not produce the necessary immunity to noise in given applications where a particularly high level is present. With preconditioned recognition it is probable and indeed can be anticipated that some noise signals will meet the imposed conditions for manifestation of presence indication. This probability becomes greater as the level of ambient noise increases; thus in a highly noisy location, just where rejection is most needed, a system may fail to provide the necessary immunity. Similarly, in the employment of noise blanking, it has been found that in installations swamped by a high level of noise transients, it is difficult if not impossible to achieve the blanking generator adjustment necessary to render the receiver unresponsive while still permitting the receipt of true reflected signals. For example, if the gain of the noise blanking generator is set too high then the receiver may be prevented from ever being capable of reacting to a true vehicle signal since it is almost at all times rendered unresponsive by the blanking signal. Thus, in an actual application it is sometimes necessary to maintain a distinct difference between the blanking generator sensitivity and the receiver sensitivity to noise, thereby necessarily establishing a range of ambiguity wherein received noise signals may cause false indication of vehicle presence. The invention of this system contemplates an improvement whereby satisfactory system performance can be accomplished while operating in a relatively high level of ambient noise.

Summary of the invention

In accordance with this invention there is provided an improved vehicle detector in which transducer means emit ultrasonic energy pulses and generate electrical signals corresponding to the pulses reflected from the vehicle. Gating means produce a signal between successive emitted pulses for a selected interval encompassing the anticipated return time of the vehicle reflected pulse to the transducer means. Receiver means responsive to the electrical signals manifest an indication of vehicle presence. The improvement rendering the receiver means less responsive to electrical coupled noise impulse signals comprises, an oscillator for generating a signal of predetermined frequency, means for mixing the electrical signals and the oscillator signal producing a resultant signal having the sum frequency of the mixed signals, and circuit means tuned to be responsive to only the resultant sum frequency signal. The circuit means is rendered responsive by the gate signal for only the selected interval for manifesting an indication of vehicle presence.

A transmitter periodically produces pulses of substantially monotonic content for driving an electro-acoustical transducer. The transducer directs its emitted energy toward the predetermined path of the moving vehicles and in the presence of a vehicle respondingly generates electrical signals induced by energy reflected from the vehicle surface.

The transducer responding signals are sensed by a receiver electrically connected to the transducer. A secondary oscillator generating a signal of predetermined frequency, selected to produce a desired resultant frequency, is also conducted to the receiver and therein is mixed with the transducer signals. As is well known in the art when two electrical signals of different frequency are mixed, a resultant composite signal comprising the sum and difference frequency of the mixed signals is produced, and either may be utilized for information conveying purposes.

The receiver is sharply tuned to the sum frequency of the trunsducer and secondary oscillator signals. The higher frequency permits achieving more sharply tuned tank circuits and a receiver response relegated to a portion of the frequency spectrum having less susceptibility to received extraneous noise signals; it has been found that the energy spectrum of the noise signals produces less frequency components of the sum frequency than the original ultrasonic pulse frequency thus permitting a high degree of noise rejection. In actual practice it has been determined that a system responding to the higher frequency is rendered less responsive to ambient noise signals, whether directly introduced into the receiver or electrically coupled to the receiver circuitry.

In addition to the utilization of sum frequency tuned circuitry, the receiver is also controlled to have its response limited to periods encompassing the anticipated transit time for an emitted signal to be reflected from a vehicle surface back to the transducer. This timing factor provides a high degree of probability that presence indication is only manifested in response to vehicle reflections. The timing of the receiver response is established by a separate receiver gate generator which period is established in accordance with the period of the emitted pulses. A detector, similarly gated, responds to receiver signals and causes an indication to show vehicle presence.

Noise blanking generation, producing a blanking signal in response to sensed electrical transients, further obviates false indication of vehicle presence due to apparent vehicle signals. The noise blanking signal accomplishes system response suppression by preventing generation of the receiver gate signal for periods encompassing the receipt time of the electrical noise signals. Thus should any electrically coupled noise signal possess the necessary energy content for producing receiver response, it is prevented from doing so by suppression of the receiver and detector.

Thus an object of the invention is a presence detector having a relatively high response to true vehicle signals and a high degree of immunity to apparent vehicle signals produced by extraneous noise signals.

It is therefore an object of this invention to provide a vehicle detector system receiver using a secondary oscillator and sum frequency tuned circuitry.

Another object of this invention is a system rendered immune to manifesting vehicle indication upon the receipt of electrical noise signals wherein use is made of noise blanking and the generation of a sum frequency signal relative to the ultrasonic frequency of the emitted pulse.

These and other objects of the invention are clearly analyzed and shown in the drawings and the following detailed description. The drawings exemplify a typical system embodiment and are not intended to limit the scope of the invention or the possible system implementations contemplating the use of the disclosed improvement. In the drawings standard electrical symbols are used and only those portions of the circuitry necessary to an understanding of the invention are shown in detail.

*Description of the preferred embodiment*

Figure 1:
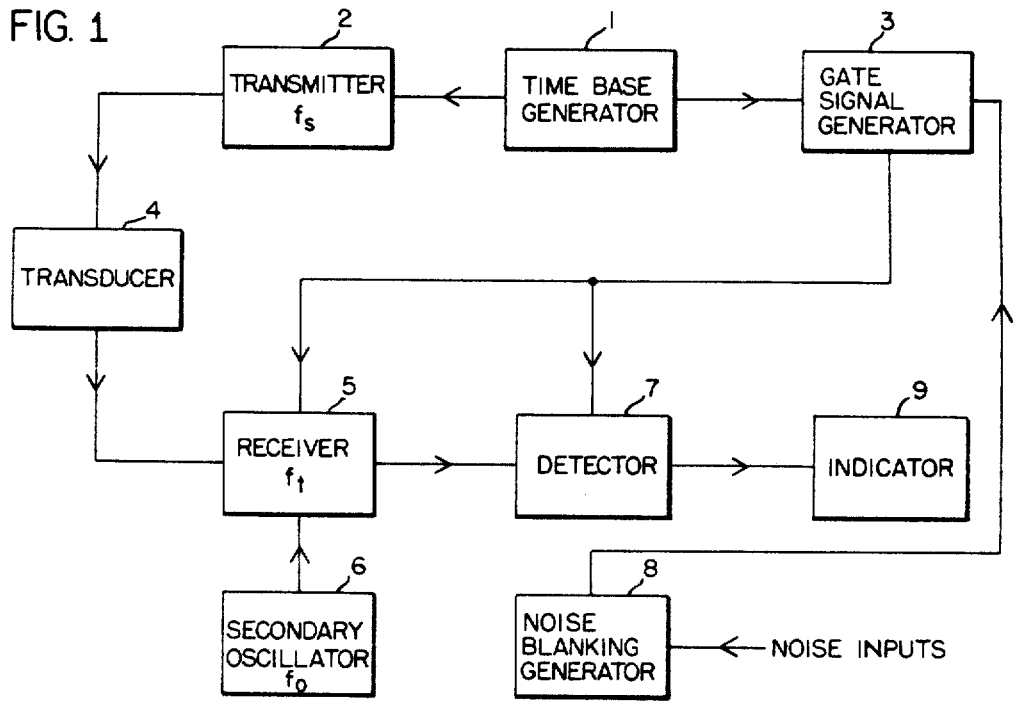
FIG. 1 is a functional block diagram of a typical ultrasonic vehicle presence detector system incorporating the improvement of this invention.

Referring to FIG. 1 a typical ultrasonic vehicle detector organization is shown. A time base generator 1 produces periodically repetitive pulses providing the basic timing drives for system operation. The frequency of these pulses is chosen so as to be compatible with system parameters and operational performance requirements. The time base generator 1 comprises any oscillator design capable of producing pulses with the needed frequency. In this particular application an astable multivibrator type oscillator is employed. Outputs are taken from both output points of the multivibrator, one utilized to drive the transmitting circuitry and the other to control the gate generation.

A transmitter 2 when commanded by an input timing pulse generates a substantially monotonic pulse of frequency $f_s$ for driving an electro-acoustical transducer 4. Since the transmitter 2 is operated or actuated by the time base generator 1, monotonic pulses of fixed period and frequency are generated on a regularly reoccurring basis. The transducer 4 converts the transmitter 2 pulse into emitted vibrational sonic energy of commensurate frequency. It accomplishes this in a manner well known in the acoustical art and no detailed description of this conversion is either supplied or need be supplied for an understanding of this invention.

Acoustical transducers as well as emitting sonic energy in response to driving signals are sensitive to pressure variations present in their environment. The transducer 4 not only emits sonic energy pulses but generates electrical signals corresponding to received pressure variations caused by sonic energy reflected from surfaces falling within its radiation zone. The radiation zone is determined principally by the designed contours and shapes of the acoustical transducers themselves, and in most applications are conformed to produce a substantially circular pattern focused so as to be confined to certain desired limits.

The radiation zone of the transducer 4 encloses an area covering the anticipated path of the moving vehicles or objects to be detected and as the vehicle enters this zone the transducer 4 produces electrical signals corresponding to reflected ultrasonic energy. A receiver 5 is electrically connected to the output of the transducer 4 and is thus sensitive to the transducer electrical output signals. The receiver 5 has its response limited to periods encompassing the anticiptated transit time of energy reflected from the moving vehicles. This limitation is provided by a signal produced by the gate signal generator 3. The gate signal generator 3 is driven by the same oscillator, time base generator 1, as the transmitter 2, hence the gate signals produced are in fixed time relation to the transmitted pulses thereby always defining a period of time relative to the emission of the sonic energy pulse.

A secondary oscillator 6, producing an output signal of frequency greater than the transducer signal, establishes another input to the receiver 5. In the receiver 5 this secondary frequency is mixed with the transducer signal and in accordance with principles well known in the art results in the generation of two separable composite signals comprising a sum frequency and a difference frequency, both containing the same informational content. The receiver 5 contains tuned circuitry, tuned to frequency $f_t$ corresponding to the sum frequency of the two receiver signals and its output is controlled in response to only those signals possessing $f_t$ frequency content.

The detector 7 senses the output of the receiver 5 and when rendered responsive by the gate signal in similar fashion to the receiver 5, produces a pulse output utilized for altering the condition of indicator 9 so as to manifest an indication of vehicle presence. The detector 7 and the receiver 5 are further controlled by a noise blanking generator 8, whereby the gate signal is suppressed for a period contemporaneous with the sensing of noise signals, thus rendering the receiver 5 unresponsive and the detector 7 incapable of altering the indicator 9 to indicate vehicle presence. This control prevents the detector from responding to noise within certain predetermined limits of sensitivity. The noise blanking generator 8 is activated by the presence of noise signals on its noise inputs arrayed at various points of the detector circuitry and power supply.

Figure 2:
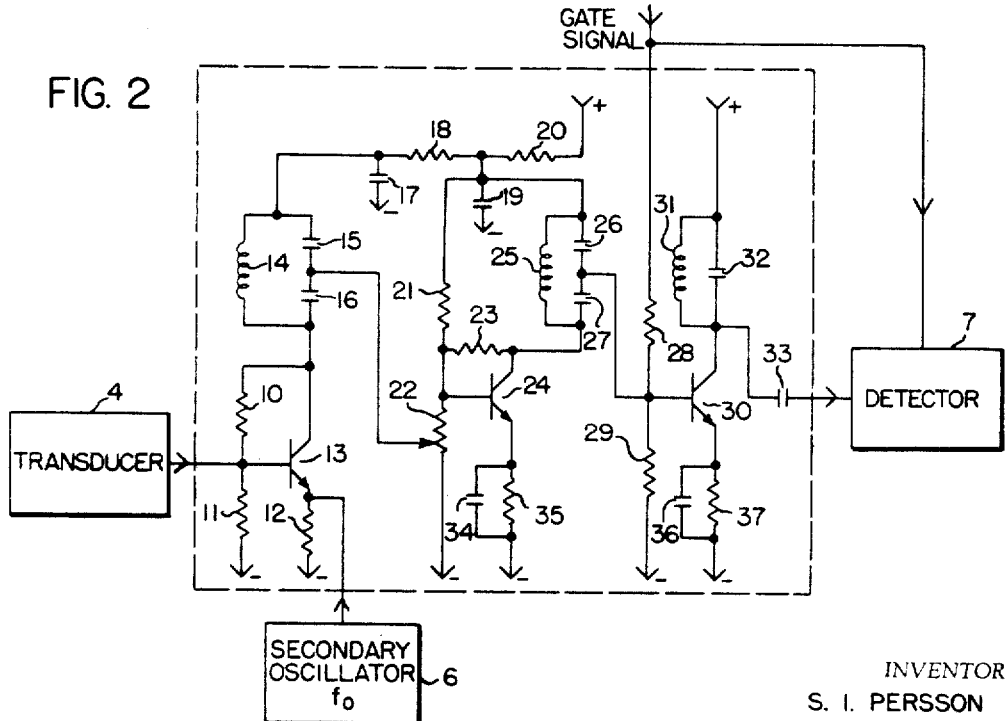
FIG. 2 is a combined functional block diagram and schematic presentation showing specific circuitry necessary to the practicing of this invention.

FIG. 2 shows particular circuitry for the receiver 5 necessary to practice the invention. Receiver 5 comprises a dual input tuned circuitry for mixing and amplifying incoming signals. The transducer 4 output signals, commensurate with its received reflected energy, as previously stated consists of mainly $f_s$ frequency. This signal is conducted into the base of transistor 13 which transistor forms the first mixing stage of the receiver 5. Transistor 13 is biased to its desired operating point by resistor 10 connecting between its collector and base and resistor 11 between the base and common. Resistor 10 further supplies a feedback voltage for gain stabilization. The oscillator 6 output signal consisting of frequency $f_o$ is conducted to the emitter of transistor 13 and develops a signal across emitter resistor 12 and common. The presence of signal $f_s$ on the base and signal $f_o$ on the emitter produces a composite signal appearing across the emitter to base junction of transistor 13 having resultant frequency components equal to the sum and difference of frequency $f_s$ and $f_o$.

The load circuit for transistor 13, i.e. the first mixer amplifier stage, comprises inductor 14 in parallel with capacitors 15 and 16; this network forms a tank circuit specifically tuned to the sum frequency of the mixer inputs hereinafter referred to as $f_t$. This tank circuit permits the first stage of amplification to present an extremely high gain for all signals comprising $f_t$ while effectively presenting a relatively negligible gain for all other signals possessing a frequency different from that of $f_t$. This components of this circuit are chosen with relatively high Q values, i.e., the ratio of inductance or capacitance reactance to effective resistance of the component, to permit extremely sharp tuning providing for rejection of all signals even those deviating only slightly from the center tuned frequency $f_t$.

The second stage of amplification for receiver 5 comprises transistor 24 and its associated circuitry. The signal from the first stage is conducted from the junction of capacitors 15 and 16, thereby providing impedance matching and DC isolation for the second stage, to potentiometer 22, the adjustment of which varies the overall sensitivity of the receiver 5. Potentiometer 22 is connected between the base of transistor 24 and common and to the junction of resistors 21 and 23. Resistor 21 is brought to the positive bus and resistor 23 connects to the collector of transistor 24. Resistors 21 and 23 and potentiometer 22 form the bias arrangement for the second stage transistor 24. Resistor 23 provides in addition to bias control, negative feedback which lends stability to the amplifier within the desired limits of acceptable gain deterioration. Similarly to the first mixing stage a tank circuit is placed in the collector of transistor 24 comprising inductor 25 in parallel with series capacitors 26 and 27. This tank circuit, as the first, is tuned $f_t$, thereby maintaining the sharp amplification and rejection factors of the first mixing stage. Resistors 20 and 18 and capacitors 17 and 19 form a filtering and decoupling network between the first and second stages and prevents coupling between the first and second stage which may result in instability or oscillation within the receiver 5. The second stage transistor 24 also has an emitter resistor 35 for establishing DC bias conditions but which does not introduce negative feedback or degeneration since it is bypassed by capacitor 34, i.e. the presence of capacitor 34 prevents any degenerative signal buildup across resistor 35 by providing a low conductance path at high frequencies particularly at $f_t$.

The output of the second stage is conducted from the junction of capacitors 26 and 27 of the tank circuit to the base of transistor 30, which with associated circuitry forms the final stage of the receiver 5. Resistors 28 and 29 determine the base biasing for transistor 30 and emitter resistor 37 bypassed by capacitor 36 establishes the emitter bias for the final stage. Since resistor 28 is brought to the gate signal, it is obvious that the third stage is only responsive when the gate signal is present. Thus, should the blanking generator 8 suppress the gate signal, the receiver 5 is rendered unresponsive. In the collector circuit of transistor 30 inductor 31 and capacitor 32 in parallel form a third tank circuit, once again tuned to frequency $f_t$. This third stage determines the final gain and output impedance for the receiver 5. The output signals are conducted through capacitor 33 for DC isolation to detector 7. The detector 7 responds to output signals of the receiver 5 above a certain threshold level and initiates indication of vehicle presence. Thus is seen that the receiver 5 comprises a high gain sharply tuned circuit rejecting any signals, whether directly introduced from the transducer 4; electrically coupled on the signal leads, shields, etc.; or conducted through the power supply; which do not essentially consist of $f_t$ or produce a resultant $f_t$ when mixed with $f_o$. The probability of noise signals containing a sufficiently high proportion of energy in the band of $f_t$ is small and therefore the liklihood of such signals initiating vehicle presence is small and may be considered negligible.

In operation, the transducer 4 driven by the transmitter 2, directs pulses of ultrasonic energy comprising a frequency of approximately 20 kc. ($f_S$) in a radiation pattern intercepting the path of moving vehicles. The reflected energy from surfaces other than passing vehicles are located at such distance so as to have a different transit time from vehicle surfaces. As a vehicle enters the radiation zone, the transducer 4 responds by producing electrical signals relative thereto.

The gate signal produced by the gate signal generator 3 renders the receiver 5 and detector 7 circuitry responsive to the transducer signals for only a period of time encompassing that needed for reflection of sonic energy from a vehicle surface. Thus the difference in transit time between a vehicle reflection and a reflection from other than a vehicle surface essentially allows the system to distinguish between vehicles and other surfaces located in its environment. In the receiver 5 the transducer 4 signal relative to the vehicle reflection is mixed with a signal output from the secondary oscillator having a frequency ($f_o$) of approximately 30 kc. or any frequency substantially higher than $f_S$. The sum of these two signal frequencies ($f_t$), 50 kc. effects a signal output from the receiver 5 due to its selectively tuned circuitry, while all other frequencies either received from the transducer or electrically coupled to the circuitry are rejected. The detector 7 responds to this signal and if not rendered inoperable by the noise blanking generator 8 establishes a change in the indicator 9 thereby manifesting an indication of vehicle presence.

In actual system implementation, other associated circuitry and controls are combined with this system to adapt it to particular requirements and needs of the installation. These, however, are not necessary to the basic operation of a sonic detector or to an understanding of this invention and therefore are not described in detail.

In sum, the present invention provides an improved ultrasonic vehicle detector permitting a high degree of discrimination between actual vehicle signal reflections and apparent vehicle signals produced by other extrinsic means. The invention introduces an economically feasible and advantageous vehicle presence detector essentially eliminating the possibility of false indication. It is realized that a study of this disclosure will obviously permit one skilled in the art to readily modify this invention and it is intended that such modifications and changes be included within the scope and spirit of the invention.

What is claimed is:
1. An improved vehicle detector including,
 (a) transducer means emitting ultrasonic energy pulses and generating electrical signals corresponding to the pulses reflected from the vehicle,
 (b) gating means producing a signal between succes- sive emitted pulses for a selected interval encompassing the anticipated return time of the vehicle reflected pulse to the transducer means, and (c) receiver means responsive to the electrical signals for manifesting an indication of vehicle presence, wherein the improvement rendering the receiver means less responsive to electrically coupled impulse noise signals comprises;

(d) an oscillator for generating a signal of predetermined frequenncy, (e) means for mixing the electrical signals and the oscillator signal producing a resultant signal having the sum frequency of the mixed signals, and (f) circuit means tuned to be responsive to only the resultant sum frequency signal and rendered responsive by the gate signal for only the selected interval for manifesting an indication of vehicle presence.

2. The vehicle detector of claim 1 wherein the means for mixing includes transistor means having base and emitter inputs for producing the resultant sum frequency signal output when the electrical signals and the oscillator signal are respectively connected to the base and emitter inputs.

3. The vehicle detector of claim 2 wherein the circuit means include:

(a) a tuned circuit connecting to the output of the mixing means and responsive to only the resultant sum frequency signal;

(b) amplifier means, connecting to the tuned circuit, having other tuned circuits for producing output signals relative to only signals of the resultant sum frequency, and (c) detector means responsive to the amplifier means output for manifesting an indication of vehicle presence.

4. The vehicle detector of claim 1 further including:

(a) means for sensing electrical noise signals, and (b) noise blanking means generating signals relative to sensed electrical noise signals for rendering the receiver means unresponsive for periods contemporaneous with the electrical noise signals.

5. The vehicle detector of claim 1 wherein the gate means produces a signal for a selected interval commencing subsequent to the cessation of the emitted pulse from the transducer means and encompassing the anticipated return time of the emitted pulse reflected from the vehicle to the transducer means.

References Cited

UNITED STATES PATENTS

| 2,978,577 | 4/1961 | Ketchledge | 340—3 X |
| 3,056,104 | 9/1962 | De Kanski et al. | 340—3 X |
| 3,329,932 | 7/1967 | Auer et al. | 340—38 |

RICHARD A. FARLEY, *Primary Examiner.*

U.S. Cl. X.R.

340—38